United States Patent [19]
Fay

[11] B 3,989,934
[45] Nov. 2, 1976

[54] WEB PENETRATION CONTROL

[75] Inventor: Charles Robert Fay, Cincinnati, Ohio

[73] Assignee: Formica Corporation, Cincinnati, Ohio

[22] Filed: Nov. 1, 1974

[21] Appl. No.: 520,063

[44] Published under the second Trial Voluntary Protest Program on March 2, 1976 as document No. B 520,063.

[52] U.S. Cl. .......................... 235/151.1; 235/151.3; 118/8; 118/9
[51] Int. Cl.² ......................................... G06G 7/58
[58] Field of Search ................ 235/151.13, 151.12, 235/151.1, 151.11, 151.3, 151.35, 151.33; 73/23, 150; 118/8, 9; 117/66

[56] References Cited
UNITED STATES PATENTS

| | | | |
|---|---|---|---|
| 3,073,153 | 1/1963 | Petitjean | 73/73 |
| 3,260,642 | 7/1966 | Canter, Jr. | 162/252 |
| 3,378,676 | 4/1968 | Clement | 235/151.3 |
| 3,596,071 | 7/1971 | Doering | 235/151.35 X |

Primary Examiner—Edward J. Wise
Attorney, Agent, or Firm—Frank M. Van Riet

[57] ABSTRACT

An improved process and apparatus are disclosed wherein the resin penetration of a web being treated on a material treater is controlled via a control of the untreated web temperature, moisture input into the untreated web, or other means.

19 Claims, 6 Drawing Figures

WEB PENETRATION CONTROL

BACKGROUND OF THE INVENTION

The use of control apparatus in processes for the production of treated materials has become more and more widespread in recent years. The high cost of labor, the increased incidence of decreased quality and the need for more uniformity in products have been the prime motivating forces behind the switch over.

In the treating of materials, e.g. the coating, impregnation etc. and drying of materials such as paper, cloth etc., it has especially become increasingly desirable to utilize a fully automatic process and U.S. Pat. No. 3,596,071 is directed to a system which approaches such a realization. This patent discloses and claims a method and apparatus for the control of a coater and dryer wherein variables such as moisture content, resin solids concentration, percent resin and percent volatiles are measured and/or computed according to various mathematical formulae. The computed values are then used to control the rate of resins application and the drying rate of the impregnated material. The controls effected by the patentee are varied by the use of analog computers and are not capable of controlling the penetration rate of a resin into a web.

SUMMARY

I have now discovered a new and novel improvement which overcomes many of the difficulties exhibited by prior art control procedures and apparatus in the treatment of material webs. My invention calculates a parameter related to penetration and controls the resin penetration into a web. The importance of resin penetration has been appreciated over a substantial period of time and visual examination of the web after resin contact and drying of the so impregnated web has been the only means of determining on-line resin distribution. Existing testing methods are static and do not give true penetration values.

My invention constitutes a method for determining dynamically on-line the degree of penetration of a resin into a web and for controlling the penetration to a desired level. Accurate control of resin penetration is essential to optimum treater capacity as well as maintenance of a high quality treated material. If a resin penetrates more than is necessary to maintain the desired quality, drying capacity is decreased since a resin solution on a web surface dries using a constant rate of drying, whereas a resin solution which has penetrated into a web dries using a falling rate of drying which requires considerably more heat. At the same time, resin penetration may need to be increased, since product quality improves with increasing penetration. Some treated materials, for example, require almost 100% penetration to maintain the required quality. My novel process can maximize or minimize resin penetration as required by quality and/or economic capacity considerations.

BRIEF DESCRIPTION OF THE DRAWINGS

FIG. 3 (3A and 3B) is a Treater Model Analog Diagram.

DESCRIPTION OF THE INVENTION INCLUDING PREFERRED EMBODIMENTS

My invention is the method and apparatus of controlling the penetration of resin into a web of a material treater. The control scheme consists of calculating (utilizing a mathematical model) the film coefficient, $h$, which I discovered relates directly to resin penetration. Based on the comparison of the calculated film coefficient ($h$) value to a desired value, continuous, automatic adjustments can be made to parameters of the material treater, changing the degree of resin penetration into the web. The parameters of the material treater which can be controlled continuously to control resin penetration, based on the variation of $h$ values from desired $h$ values for a particular resin-web system, are the temperature(s) of web preheat roll(s) before the coater, the amount of moisture added to the web by a web conditioning device, such as a cloud chamber device, the oven temperature profile (travel direction), the temperature of the resin etc. For example, increases in moisture content of a web improve penetration. As other examples, oven temperatures adjusted in an increasing profile, starting with a low first zone temperature, and gradually increasing each subsequent zone temperature, or heating the resin per se also improve penetration.

Figure 1:
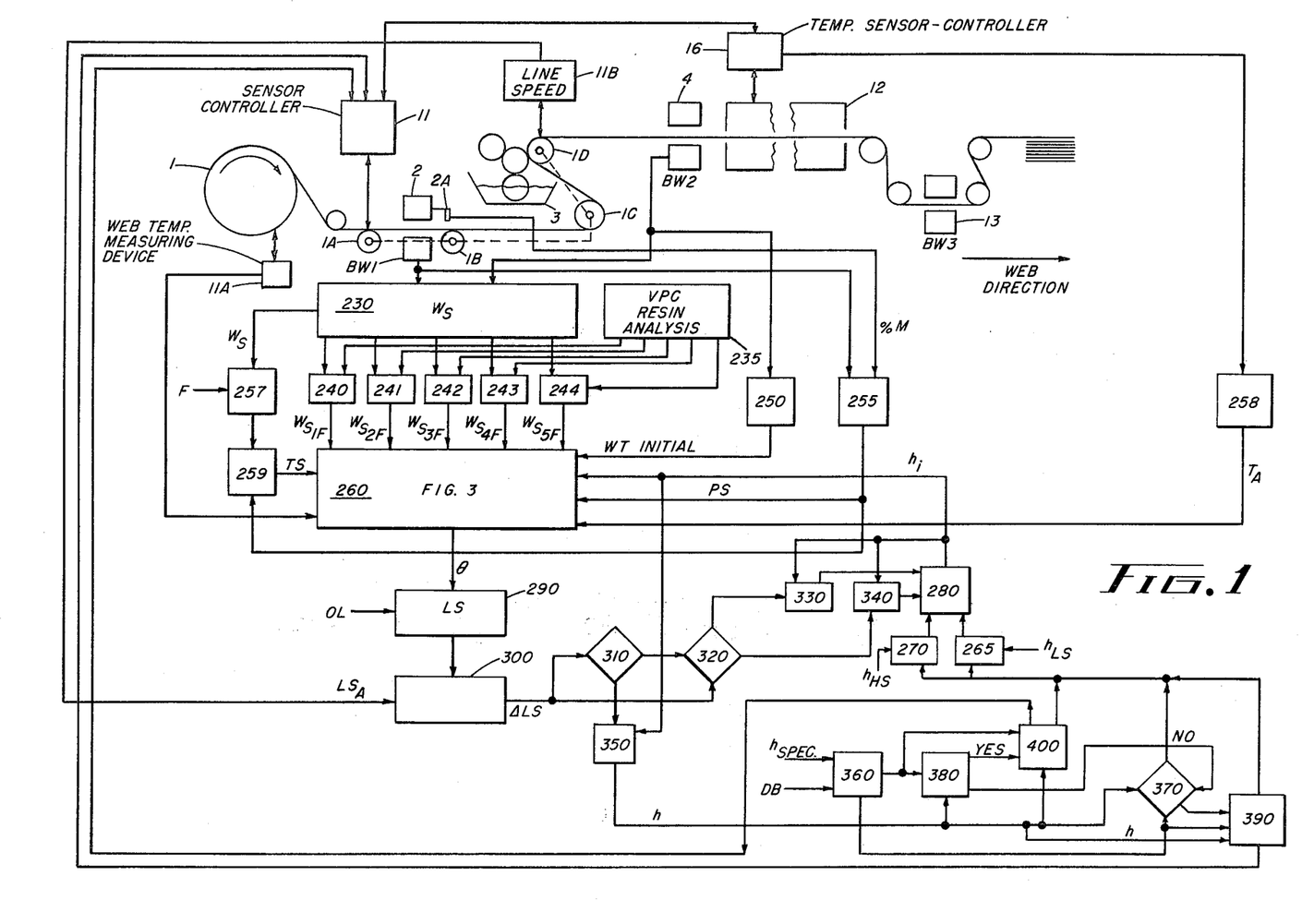
FIG. 1 is a diagrammatic view of a coating and drying process for a material treater, showing three beta gauges, a reverse roll coater, dryer, cutting and stacking equipment and an example of a web penetration control system including a sensor and controller in conjunction with web heating and cooling rolls. The rolls could be replaced by a moisture addition device, or similar conditioning equipment.

The beta gauge system utilized in my invention (FIG. 1) is detailed in U.S. Pat. No. 3,596,071. The %Ra resin and the %Va volatiles can be but are not restricted to the same calculations; e.g., $$\% \text{ Resin} = \%Ra = \frac{\text{Resin Solids}}{\text{Paper Fiber}} = \frac{(BW_2 - BW_1) F}{BW_1 \left(1 - \frac{\%M}{100}\right)} \times 100$$

$$\% \text{ Volatiles} = \% Va = \frac{BW_3 - \left[(BW_2 - BW_1)F + BW_1\left(1 - \frac{\%M}{100}\right)\right]}{BW_1\left(1 - \frac{\%M}{100}\right)} \times 100$$

$$= \frac{\text{Residual Volatiles}}{\text{Paper Fiber}}$$

where:
$BW_1$ = raw paper basis weight (lbs/3,000 sq. ft.)
$BW_2$ = raw paper + wet resin basis weight (lbs/3,000 sq. ft.)
$BW_3$ = dried treated paper basis weight (lbs/3,000 sq. ft.)

F = ASTM resin solids fraction (or solids fraction from an instrument response.)

%M = % paper moisture

Referring to FIG. 1, the fibrous web of paper, cloth, etc. is in roll form at the raw web roll 1, and the raw web passes around (or through) a web penetration control device, shown at 1A, for example as heating-/cooling rolls, with a sensor-controller 11 shown connected to 1A, to sense and control the roll temperature. This control device can also be located at points 1B, 1C, 1D, or any position before the end of the oven closest to BW₃ 13. The temperatures of rolls 1B and/or 1C and/or 1D can also be controlled similarly. Device 1A shown as a roller (or any of the other previously mentioned devices) can also be replaced by some other type of web penetration control device, such as a moisture-adding unit, e.g. a cloud chamber, with device 11 being a moisture sensing-control device, a device which can sense and control the oven temperature profile, a resin temperature sensor controller or any other device for the control of web penetration known to those skilled in the art of web treaters. Any of these devices could be used in combination with any or all other devices. Web temperature measuring device 11A measures the web temperature and transmits the value to 260, FIG. 3A. The raw web basis weight $BW_1$ is measured by beta gauge 2, and web moisture is measured by moisutre gauge 2A. The web passes through coater 3, shown as a four roll reverse roll coater, through the wet resin beta gauge 4, which measures $BW_2$, into a dryer 12, and the final dried (treated) weight ($BW_3$) is measured by beta gauge 13. This measurement is then used to calculate %Va via the above formula which is then an input to 216 of FIG. 3A. Temperature sensor-controller (16) measures and controls the individual oven zone temperature(s); $T_{A_1}$, $T_{A_2}$, $T_{A_3}$ etc. Line speed sensor 11B measures the actual line speed, $LS_A$.

Figure 2:
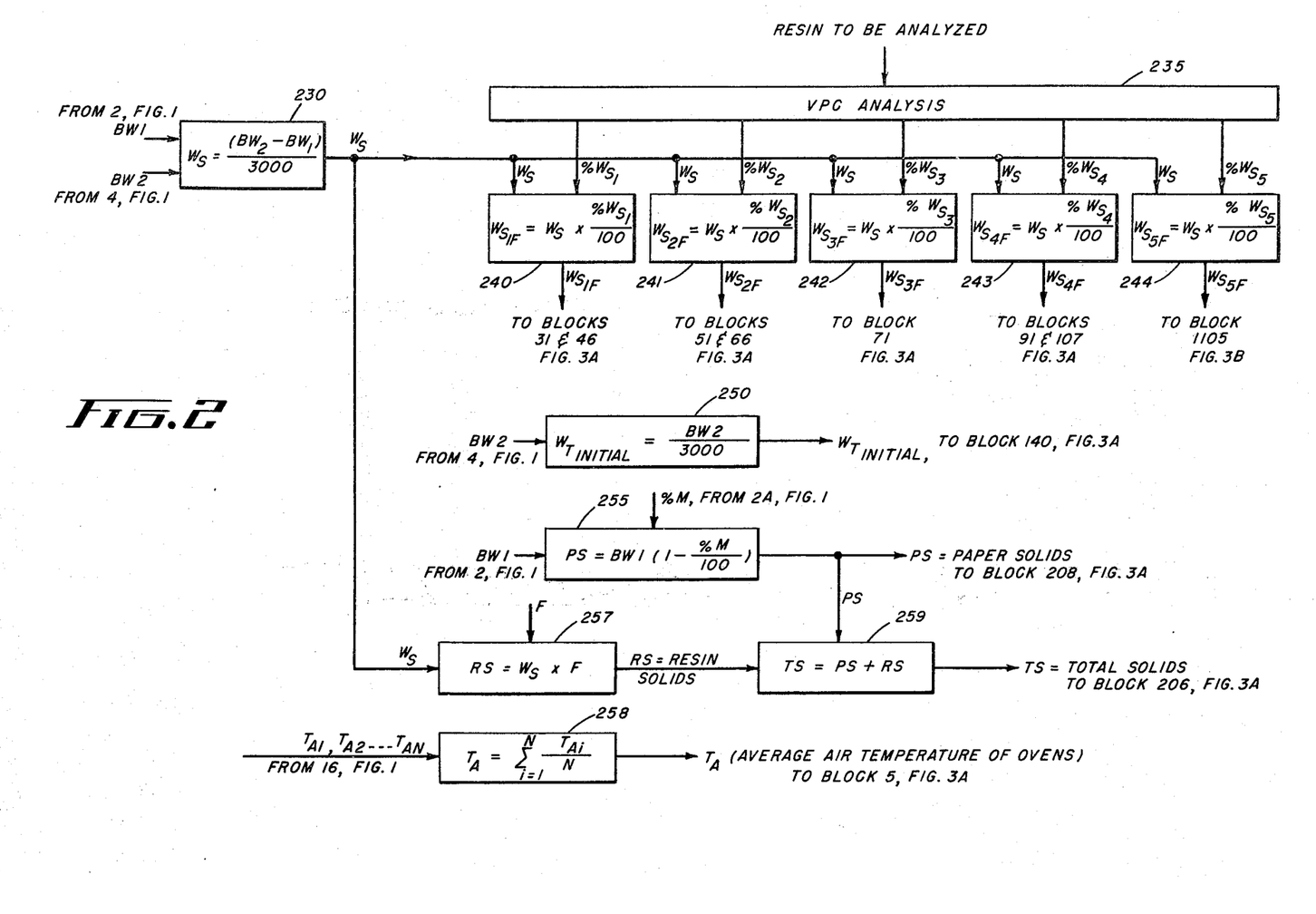
FIG. 2 is a diagram showing the calculations involved in determining the inputs to FIG. 3.

To calculate the film coefficient, $h$, which I discovered relates directly to resin penetration and can be used to control resin penetration, it is necessary to relate the $h$ value to the drying of a given resin-web system. FIGS. 2 and 3 are examples of a means that can be used to relate $h$ values to the drying of a resin-web system through a treater model, a mathematical model of the drying operation of a material treater. The remainder of FIG. 1, incorporates the diagrams of FIGS. 2-5 and how they relate to the coater and dryer system.

Figure 3A:
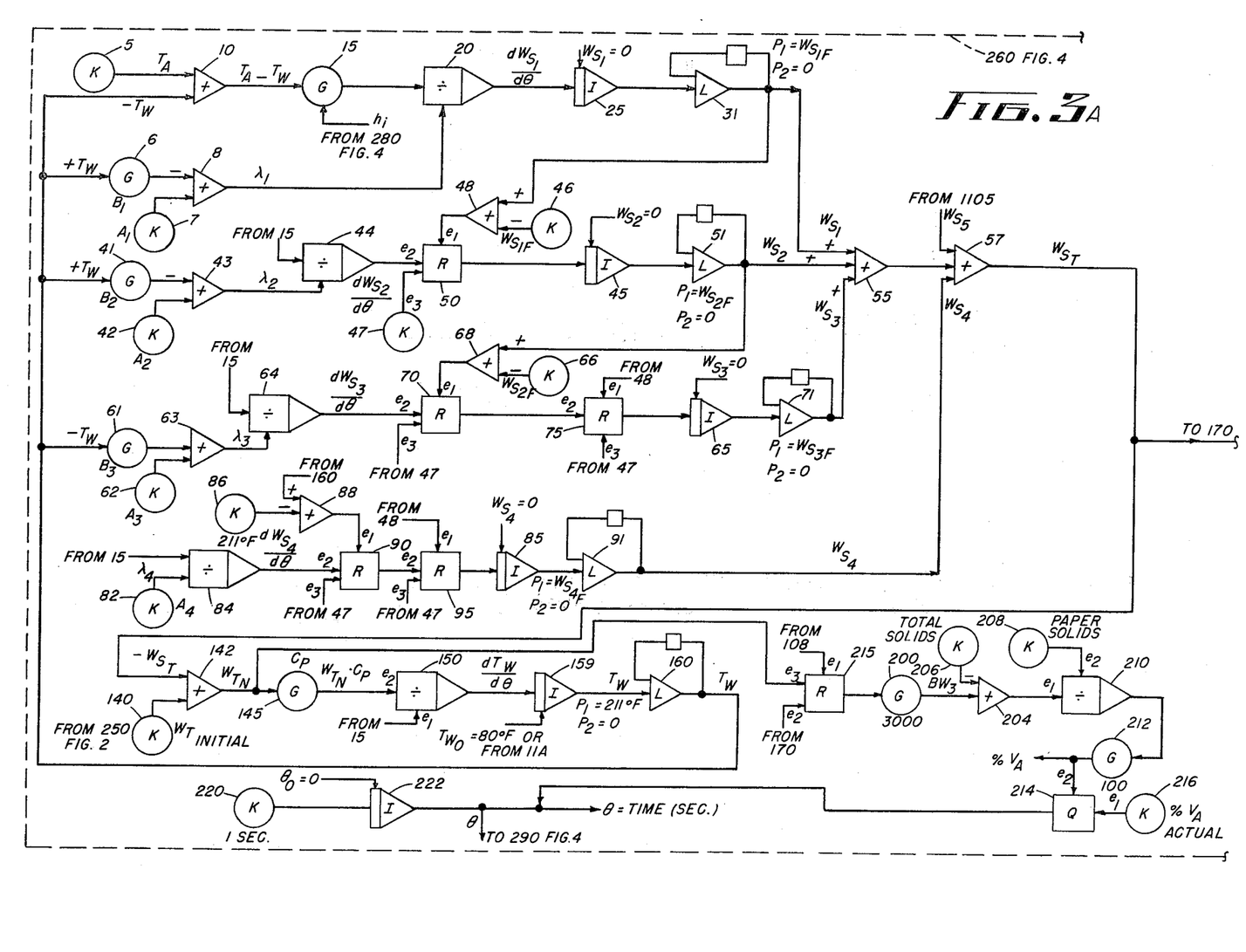
Figure 3B:
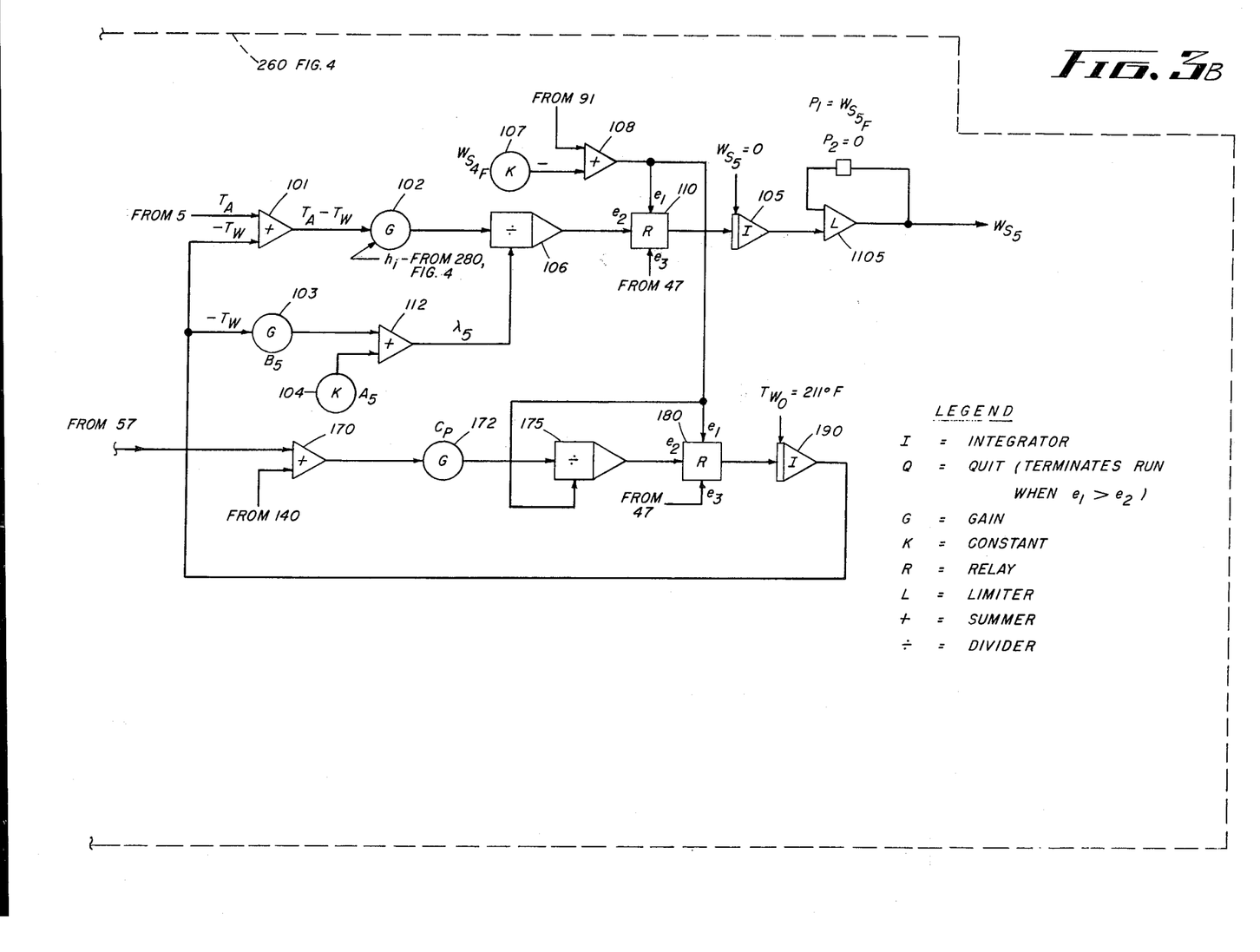

FIG. 2 is a block diagram showing the calculations of the inputs to the Treater Model, FIG. 3. Referring to FIG. 2, block 235 gives the Vapor Phase Chromotograph (VPC) analysis of the resin with which the given web is coated. This could be replaced by an off-line analysis or any online continuous measuring device which could be used to determine the percentage composition of the solvent in the resin system. For the example under study, five solvent components are involved and are analyzed, with resulting %'s by weight given as $\%W_{S_1}$, $\%W_{S_2}$, $\%W_{S_3}$, $\%W_{S_4}$, and $\%W_{S_5}$. Block 230 calculates $W_s$, the total weight of wet resin (resin solvents plus solids) per square foot, from $BW_1$ (2, FIG. 1) and $BW_2$ (4, FIG. 1) basis weight readings, in lbs. per 3,000 sq. ft. $W_S$ and $\%W_{S_1}$ are the inputs to block 240, which calculates $W_{S_{1F}}$ (the final weight of the first solvent component in lbs. per sq. ft.), inputs to block 31 and 46, respectively, of FIG. 3A. In the same manner, $W_{S_{2F}}$ is calculated in block 241 and is used as inputs to blocks 51 and 66, respectively, of FIG. 3A, $W_S$ is calculated in block 242, and is used as an input to block 71 of FIG. 3A, $W_{S_{3F}}$ is calculated in block 243 and is used as inputs to blocks 91 and 107, respectively, and $W_S$ is calculated in block 244 and is used as an input to block 1105 of FIG. 3B. The initial web wet weight (weight of web after coating, $BW_2$ divided by 3,000), $W_T$ initial in lbs. per sq. ft. is calculated in block 250, and is the input to block 140, FIG. 3A. In block 255 is calculated paper solids (PS) (web solids), from inputs to block 255 of $BW_1$ (from 2, FIG. 1) and %M, moisture from 2A, FIG. 1, or a constant manual entry, with PS being an input to block 208, FIG. 3A and also to block 259. This moisture input is not a necessary portion of the invention but is presented here only as a preferred embodiment. Note that if the %M were a constant manual entry of zero, the method would be identical to no input of moisture. Hence the previous equations for %Ra and %Va would be modified aaccordingly by replacing all $BW_1$ $$\left(1 - \frac{\%M}{100}\right)$$

with $BW_1$. Block 257 calculates the Resin Solids (RS) from $W_S$, from block 230, and F, the resin solids fraction, as determined by the ASTM solids test or by instrumentation, a manual or continuously measured or data base entry. The RS value should be multiplied by 3000 in order to equate the bases of the inputs RS and PS in the next calculation. Block 259 calculates Total Solids (TS) from Resin Solids (RS), block 257, and Paper Solids (PS), block 255, and TS is the input to block 206, FIG. 3A. Block 258 calculates the average oven air temperature, $T_A$, from the individual zone air temperatures, $T_A$ is ($T_{A_1}$, $T_{A_2}$ . . . $T_{A_n}$) from block 16, FIG. 1. $T_A$ is the input to block 5, FIG. 3A.

FIG. 3 (3A and 3B) is a Treater Model Analog Diagram, that is solved either on an analog computer, or by using a digital computer to solve an equivalent digital program.

The following assumptions were made in developing the treater model, the distributed parameter mathematical model of the dryer (modelling the drying of 1 sq. ft. of web as it passes through the dryer):

1. Specific heat of the wet web (Cp) can be considered a constant.
2. The changes in humidity of the air in the dryer can be neglected due to the large air volumes.
3. The heat is transferred to the treated web entirely by convection from the heated air.
4. The constant rate of drying equation well represents the total drying in the oven of the treater.
5. The solvents are removed in the order of increasing boiling points and increasing vapor pressures, with the exceptions of phenol and water.
6. Phenol and water are removed as an azeotrope at 211°F., the composition of the azeotrope being 90.8% by weight water, 9.2% by weight phenol.
7. Additional phenol, due to its high boiling point and low vapor pressures at lower temperatures, and due to the presence of the azeotrope with water at 211°F., will not be removed by itself until after the water present has been used up by the azeotrope.
8. No chemical reaction occurs during the treating operation.

Considering the constant rate of drying, at steady state the heat that flows into the web must be equal to that removed by the evaporated solvents. When air is the only heat source (convective heat transfer only), the balances are as follows:

$$\frac{dQ}{d\theta} = hA(T_A - T_w) \quad (1)$$

$$\frac{dW_{si}}{d\theta} = \frac{dQ}{d\theta} / \lambda i \quad (2)$$

thus: $\frac{dW_{si}}{d\theta} = \frac{hA(T_A - T_w)}{\lambda i} \quad (3)$

For the heating of any material:

$$\frac{dQ}{d\theta} = W_{T_n} Cp \frac{dT_w}{d\theta} \quad (4)$$

thus: $\frac{dT_w}{d\theta} = \frac{hA}{W_{T_n} Cp}(T_A - T_w) \quad (5)$ where:

| | |
|---|---|
| $\frac{dQ}{d\theta}$ | = rate of heat absorption, Btu/sec. |
| h | = film coefficient or convective heat transfer coefficient, $\frac{Btu}{sec. ft.^2 °F.}$ |
| A | = area of heat transfer surface, sq. ft.; = 1 sq. ft. (basis of calculations) |
| $T_A$ | = air temperature, °F. |
| $T_w$ | = web temperature, °F. |
| $\frac{dW_{si}}{d\theta}$ | = rate of removal of solvent i, lbs./sec. |
| Cp | = heat capacity, Btu/lb. |
| $W_{T_n}$ | = weight of 1 sq. ft. of web in dryer, at time $\theta$., pounds. |
| $\lambda i$ | = latent heat of vaporization of component i, Btu/lb. |

Equation 3 is used to solve for $W_{si}$ and equation 5 is used to solve for $T_w$. These two differential equations are solved simultaneously using an analog computer programmed as shown in FIG. 3 (3A and 3B). Referring to FIG. 3, the treater model diagram will be described as it relates to phenolic treated paper. Starting at pot 5, $T_A$, the average air temperature of the ovens, and $-T_W$, the web temperature are summed by amplifier 10. The resulting $T_A-T_W$ signal is passed through a potentiometer 15 with $h_i$ from 280 FIG. 4 to give a gain, to obtain $h_i(T_A-T_W)$. The latent heat of vaporization for component 1 (Methanol in this case) is calculated for the web temperature $T_W$, by pots (6) and (7) ($B_1$ and $A_1$ are constants) being summed by amplifier (8). The division circuit 20 then calculates $$\frac{dW_{si}}{d\theta} = \frac{h_i(T_A-T_w)}{\lambda 1} i$$

(A=1 sq. ft.), equation 3.

Integrator 25 solves $dW_{S1}/d\theta$ for $W_{S1}$. Limiter 31 limits the integrator 25 output to the total weight ($W_{S1F}$) of methanol present in the resin used for impregnating the raw paper web. In the same manner, the other alcohols, ethanol 51 and isopropanol 71, are removed during the drying operation. The water:phenol azeotrope 91 is removed at the azeotrope temperature of 211°F., by holding the web temperature during azeotrope removal at 211°F.

Once the water:phenol azeotrope is removed, the web temperature again increases as phenol block 1105 is removed, until the final %Va is obtained. The %Va is continuously calculated as described below.

Amplifiers 55 and 57 are used to sum the weight of the components removed by drying at a given time. The total weight removed $W_{ST}$ from Amplifier 57 is inputted to Amplifier 142, along with $W_T$ initial, pot 140, the initial weight of the raw paper and wet resin, ($BW_2/3,000$) in lbs./sq. ft., from block 250, FIG. 2. The resultant $W_{T_n}$, the weight remaining after drying, is then multiplied by Cp 145 to form $W_{T_n}$ Cp. Divide circuit 150 gives (see equation 5)

$$\frac{dT_w}{d\theta} = \frac{h_i(T_A-T_w)}{W_{T_n} Cp}$$

(since $A=1$ sq. ft.) and integrator 159 solves for $T_W$ as a function of time. Limiter 160 limits the output of integrator 159 to 211°F., the water:phenol azeotrope temperature. Once the azeotrope is removed, the analog circuit of Amplifier 101 through Integrator 190 calculates the weight 1105 of phenol removed and the web temperature during the phenol removal 190. Relay 215 selects the desired $W_{T_n}$ which is multiplied by 3,000 200 to obtain $BW_3$, in lbs.3,000 sq. ft. %Va is then calculated by Amplifier (204), pots 206 and 212 and divide circuit 210.

The %Va actual (the desired model output i.e. the actual dryer output value) is the input to block 216. Block 214 compares $e_2$ (%Va calc., the model output %Va) to $e_1$ (%Va actual). If $e_1$ is greater than $e_2$, the computer run is terminated. Block 220 inputs a time base (for example, 1 second) to block 222, which is an integrator with an initial value of 0. The output from integrator block 222 is the time ($\theta$) in seconds required for the model to obtain the %Va calc.= %Va actual i.e. the drying time. It should be noted that $e_1$ is the first input to a given block $e_2$ the second and $e_3$ the third, in all instances.

Figure 4:
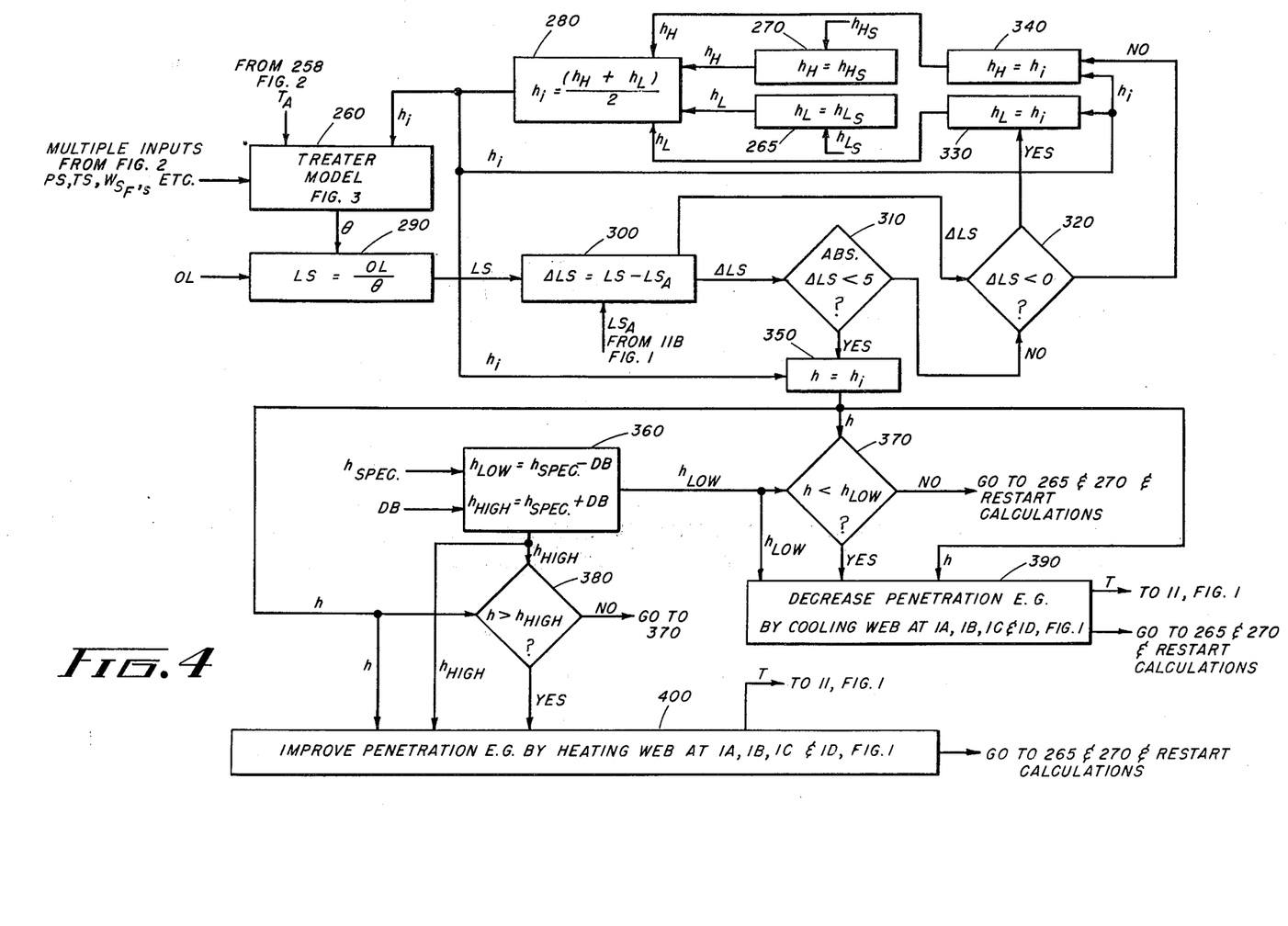
FIG. 4 is a diagram for determining and controlling the degree of penetration of a resin into a web.

FIG. 4 is a block diagram showing an example of the determination and control of the degree of resin penetration into a web. The Treater Model (FIG. 3A and 3B) block (260) is used, along with an "interval halving" convergence method, a known convergence calculation method, to calculate h, the film coefficient which relates to resin penetration into a web. Any similar convergence method or iterative technique (e.g. Newton-Raphson, Wegstein, secant, etc.) familiar to those skilled in the art can be used in FIG. 4 in place of blocks 265 through 350, inclusive, except 290. Starting at blocks 265 and 270, the initial value of the high h, $h_H$, is set equal to an initial estimate high value of h, $h_{Hs}$, in block 270, and in the same manner the low value of h, $h_L$, is set equal to $h_{Ls}$ in block 265. Block 280 calculates $h_i$ from $h_H$ and $h_L$ with $h_i$ as input to the Treater Model, block 260. The other inputs to block 260 are $T_A$ from block 258, FIG. 2, and TS, PS, $WS_F$'s and the other inputs as detailed on FIG. 2. The Treater Model, block 260, calculates the drying time $\theta$ seconds, as detailed in FIG. 3. Block 290 calculates the treater model line speed, LS, from the dryer oven length, OL, and $\theta$. Block 300 calculates ΔLS from LS and $LS_A$, the actual line speed from block 11B, FIG. 1. Block 310 determines if the absolute value (ABS) of (ΔLS) is less than the desired line speed error, e.g. 5. If ΔLS is less than 5, (or any other value desired) the desired convergence has been achieved, and h is set equal to $h_i$ in block 350. Block 360 calculates the range of h values desired from experimentation, h spec. ± DB (the deadband) i.e. $h_{low}$ and $h_{high}$, a range within which no control corrections are required to obtain an acceptable penetration level. The deadband DB and the desired specification $h$ spec. values are dependent on the particular resin-web system being used. Block 380 determines if $h$ (actual value) is greater than $h_{high}$. If the answer is yes, block 400 improves penetration, for example, by heating the web (see FIG. 5). The calculations and control are then restarted, going to blocks 265 and 270. If the answer from block 380 is no, block 370 checks to see if $h$ is less than $h_{low}$. If the answer is yes, block 390 decreases penetration, for example, by cooling the web (see FIG. 5). The calculations and control are then restarted by going to blocks 265 and 270. Likewise, if from block 370 the answer is no, the calculations and control are also restarted by going to blocks 265 and 270. The increases or decreases in penetration required in blocks 400 or 390, respectively, can also be achieved by any of the other standard techniques, as mentioned earlier.

If, however, from block 310 the answer is no, with ABS ($\Delta$LS) >5, block 320 determines if $\Delta$LS is less than zero. If the answer is yes, then the $h_i$ value used in the previous calculation of the treater model block 260 is used to improve upon the lower estimate, $h_L$, in block 330, and this $h_L$ is used, along with the same $h_H$ value used previously to calculate a new $h_i$ value in block 280. This new $h_i$ value from block 280 is used by block 260 to calculate a new $\theta$ value and hence repeat all calculations as previously described, until the desired convergence is achieved in block 310. In the same manner, if the answer from block 320 is no, $h_H$ is set equal to $h_i$ in block 340, and this new $h_H$ is used with the previous value of $h_L$ to calculate a new $h_i$ value in block 280, and the calculations proceed as previously described.

Figure 5:
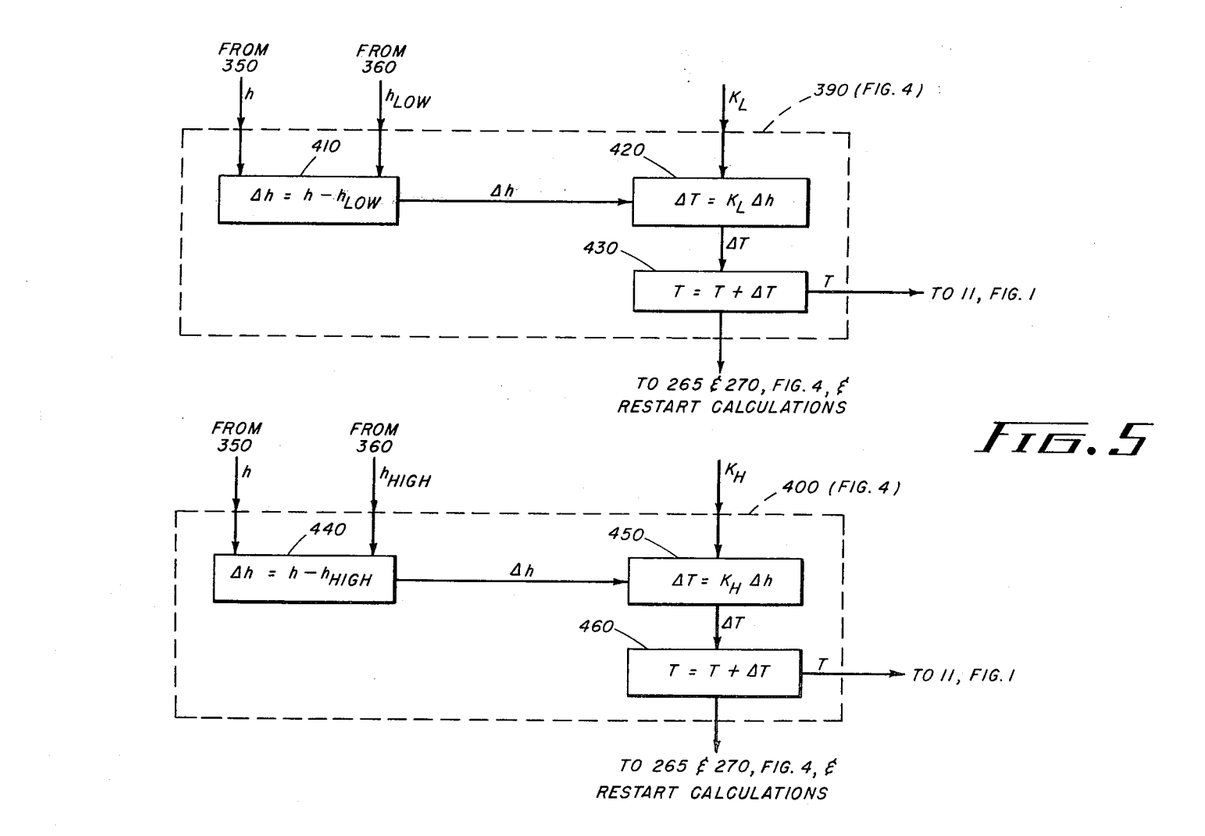
FIG. 5 is an example of a web penetration control algorithm used in conjunction with the heating and/or cooling rolls of FIG. 1.

FIG. 5 shows a web penetration control algorithm which can be used with heating/cooling rolls in block diagram form, blocks 390 and 400 of FIG. 4. In block 390, block 410 calculates $\Delta h$ from $h$ of block 350 and $h_{low}$ from block 360. Block 420 calculates $\Delta T$, the decrease in temperature desired at the heating/cooling roll 1A (and/or 1B and/or 1C etc.) of FIG. 1, from $\Delta h$ and $K_L$, a tuning constant dependent on web penetration responses to changes in the heating/cooling roll temperature. The new desired roll temperature, T, is calculated by block 430, and this T value is sent to SensorController 11, of FIG. 1, which controls the temperature of the heating/cooling roll(s), 1A (and/or 1B and/or 1C etc.), of FIG. 1. In the same manner, block 400 calculates the temperature required to improve (increase) resin penetration into the web. Blocks 440, 450 and 460, are used in the calculations.

The following explanation is given to demonstrate the relationship between $h$ (the heat transfer coefficient calculated using the treater model of FIGS. 3A and 3B and the convergence procedure of FIG. 4) and the resin penetration. Table I shows the film coefficient values, $h$, versus the % resin penetration of a specific resin into a specific web.

The $h$ values were calculated by equations and methods detailed in FIGS. 2, 3 (A and B) and 4 above, and the % penetration values were determined by visual examination of the dried, coated web.

TABLE I

| % Resin Penetration Versus h Values | |
|---|---|
| % Resin Penetration | h (Btu/sec. ft.$^2$ °F.) |
| 100% | .0035 |

TABLE I-continued

| % Resin Penetration Versus h Values | |
|---|---|
| % Resin Penetration | h (Btu/sec. ft.$^2$ °F.) |
| 95% | .0043 |
| 80% | .0055 |
| 60% | .0062 |
| 50% | .0079 |
| 20% | .0085 |
| 10% | .0150 |

The web used for obtaining Table I was commercially available kraft saturating paper, and the resin used was a phenolic resin, also commercially available. Thus, Table I shows that the $h$ values are affected significantly by % resin penetration.

EXAMPLE 1

Various treatments using a material treater such as that depicted in FIG. 1 were made, using paper A and resin B, both commercially available. Paper A is a saturating grade of kraft paper, and resin B is a phenolic resin used in postforming grades of laminated plastics. Properties of postforming laminates are generally known to be dependent on resin penetration. The following Table II gives the results of various treatments of paper A with different lots of resin B.

TABLE II

| Resin B | n/Btu/ sec.ft.$^2$ °F.) | Laminate Properties | | | |
|---|---|---|---|---|---|
| | | Poor | Fair | Good | Excellent |
| Lot 1 | .0035 | | | | X |
| 2 | .0043 | | | | X |
| 3 | .0058 | | | X | |
| 4 | .0085 | X | | | |
| 5 | .0068 | | X | | |
| 6 | .0150 | X | | | |

The laminate properties were rated from Excellent to Poor, based on standard postforming laminate tests, such as blister times, forming radius, etc. Poor laminates completely failed all tests, and were unacceptable. Fair laminates failed in a few cases, and Good and Excellent laminates were totally acceptable as postforming grade laminates, only varying as to how high were the blister time values, and how low were the forming radii of the laminates.

Since we desire all laminate properties to be good or excellent, we would like to have a large percent penetration which implies (as shown in Table I) a low $h$. But also a high $h$ (heat transfer coefficient) is desirable because this means a more efficient drying operation (less energy usage and/or greater throughput). Thus we desire the highest $h$ which insures product quality. Referring to Table II, this highest $h$ is 0.0058. Since we prefer to always make good or excellent laminates in preference to having an efficient oven, this should be the highest allowable $h$, i.e. $h_{high}$ (block 360, FIG. 4). An acceptable deadband (DB, block 360, FIG. 4) is 0.0015 (= 0.0058–0.0043), which would insure the $h$ value and thus the resin penetration, and thus the final laminate properties to be in the acceptable range. If, for example, the $h$ value was determined to be 0.0068, as it was for lot 5, Table II, FIGS. 4 and 5 would increase the heating roll temperature, T, of roll 1A etc., to increase penetration into the web. Likewise, the temperature T, would be increased for lot 6, Table II, to increase resin penetration into the web.

I claim:

1. A method of controlling the penetration of a resin from a solution thereof into a fibrous host material including impregnating said host material with a resinous solution and drying the resultant impregnated material which comprises:
   1. measuring the weight of said host material before impregnation and providing a signal (A) representative of said weight,
   2. measuring the weight of the resultant impregnated material before drying and providing a signal (B) representative of said weight of said impregnated, undried material,
   3. measuring the weight of the dried, impregnated material and providing a signal (C) representative of said weight of said dried material,
   4. providing a signal (D) representative of the initial temperature of said host material,
   5. providing a signal (E) representative of the resins solids fraction of said resinous solution,
   6. calculating from said signals (A), (B), (C) and (E) the actual percent volatiles of said impregnated, dried material and providing a signal (F) representative of said actual percent volatiles,
   7. providing a signal (G) representative of the solvent component percentages and a signal (H) representative of the latent heat of vaporization of each solvent component of said resinous solution,
   8. measuring the line speed of said host material and providing a signal (I) representative of said line speed,
   9. providing a signal (J) representative of the length of the dryer,
   10. measuring the dryer temperature and providing a signal (K) representative of said dryer temperature,
   11. providing a signal (L) representative of the heat capacity of the host material,
   12. computing the actual film coefficient of the impregnated, dried material from said signals (A), (B), (D), (E), (F), (G), (H), (I), (J), (K) and (L) and providing a signal (M) representative of said actual film coefficient,
   13. providing a signal (N) representative of the desired predetermined film coefficient of the material undergoing drying,
   14. computing the variance from or the compliance of said signal (M) with said signal (N) and providing a signal (O) representative of said variance or compliance computation,
   15. computing the need for a change in the penetration of said resin into said host material from said signal (O) and providing a signal (P) representative of said needed change,
   16. computing the penetration change required to substantially equalize said signal (M) and said signal (N) and providing a signal (Q) representative of said required penetration change and
   17. controlling the penetration of said resin into said host material in accordance with said signal (Q).

2. A method according to claim 1 including providing a signal (R) representative of the moisture content of said host material before impregnation and using said signal (R) in computing said actual film coefficient.

3. A method according to Claim 2 wherein said moisture content is continually measured.

4. A method according to claim 1 wherein said solvent component percentages are provided by continuous on-line measurement.

5. A method according to Claim 1 wherein said actual film coefficient of the impregnated, dried material is computed by
   a. calculating from said signal (B) the weight of the impregnated, undried host material on a per square foot basis and providing a signal (S) representative of said basis weight,
   b. providing signal (R) representative of the moisture content of said host material before impregnation, calculating from said signal (A) and said signal (R) the dry weight of the host material and providing a signal (T) representative of said dry weight,
   c. calculating from said signal (A) and said signal (B) the amount of resinous solution applied to said host material before drying on a per square foot basis and providing a signal representative of said amount of applied solution,
   d. calculating the total resin solids impregnated into said host material from said signal (U) and said signal (E) and providing a signal (V) representative of said total resin solids impregnated,
   e. calculating the total solids of the impregnated host material from said signal (T) and said signal (V) and providing a signal (W) representative of said total solids of the impregnated host material,
   f. calculating the final weight of each solvent component from said signal (G) and said signal (U) and providing signal (X) representative of said final weights and
   g. calculating said actual film coefficient from said signals (S), (T), (W), (X), (D), (F), (C), (H), (I), (J), (K) and (L).

6. A method according to claim 1 wherein said actual film coefficient is computed by convergence.

7. A method according to claim 1 wherein the penetration of said resin into said host material is controlled by adjusting the temperature of said material before impregnation.

8. A method according to claim 1 wherein the penetration of said resin into said host material is controlled by adjusting the moisture content of said host material.

9. A method according to claim 1 wherein the penetration of said resin into said host material is controlled by adjusting the temperature profile of the dryer.

10. A method according to claim 1 wherein the penetration of said resin into said host material is controlled by adjusting the temperature of said resin.

11. In a fibrous host material treating process wherein said material is impregnated by a resinous solution in a treater and dried in a dryer, apparatus for controlling the penetration of the resin into said host material comprising
    1. first gauge means adjacent to said material for measuring the weight of said material before impregnation and providing a signal (A) representative of said weight,
    2. second gauge means mounted before said dryer and adjacent to said material for measuring the impregnated, undried weight of said material and providing a signal (B) representative of said weight of said impregnated, undried material,
    3. third gauge means mounted after said dryer and adjacent to said material for measuring the dried weight of said impregnated material and providing a signal (C) representative of said weight of said dried material,
    4. means for providing a signal (D) representative of the initial temperature of said host material, 5. means for providing a signal (E) representative of the resin solids fraction of said resinous solution,
6. means responsive to said signals (A), (B), (C) and (E) for calculating the actual percent volatiles of said impregnated, dried material and providing a signal (F) representative of said actual percent volatiles,
7. means for providing a signal (G) representative of the solvent component percentages and a signal (H) representative of the latent heat of vaporization of each solvent component of said resinous solution,
8. means for measuring the line speed of said material and providing a signal (I) representative of said line speed,
9. means for providing a signal (J) representative of the dryer length,
10. means for measuring the temperature of said dryer and providing a signal (K) representative of said dryer temperature,
11. means for providing a signal (L) representative of the heat capacity of the host material,
12. means responsive to said signals (A), (B), (D), (E), (F), (G), (H), (I), (J), (K) and (L) for computing the actual film coefficient of the impregnated, dried material and providing a signal (M) representative of said actual film coefficient,
13. means responsive to said signal (M) for computing whether said signal (M) is at a variance or in compliance with a signal (N) representative of a predetermined film coefficient and providing a signal (O) representative of the conformity or nonconformity of said signal (M) and said signal (N),
14. means responsive to said signal (O) for computing the penetration change required to substantially equalize said signal (M) and said signal (N) and providing a signal (Q) representative of said required penetration change and
15. means responsive to said signal (Q) for controlling the penetration of said resin into said host material.

12. Apparatus according to Claim 11 comprising fourth gauge means mounted before said treater and adjacent to said host material for providing a signal (R) to said actual film coefficient computing means representative of the average moisture content of said material.

13. Apparatus according to claim 11 wherein said means for computing and providing signal (M) includes,
  a. means responsive to said signal (B) for computing the weight of the impregnated, undried host material on a per square foot basis and providing a signal (S) representative of said basis weight,
  b. means responsive to said signal (A) for computing the dry weight of the host material and providing a signal (T) representative of said dry weight,
  c. means responsive to said signal (A) and said signal (B) for computing the amount of resinous solution applied to said host material before drying on a per square foot basis and providing a signal (U) representative of said amount of applied solution,
  d. means responsive to said signal (U) and said signal (E) for computing the total resin solids impregnated into said host material and providing a signal (V) representative of said total resin solids impregnated,
  e. means responsive to said signal (T) and said signal (V) for computing the total solids of the impregnated host material and providing a signal (W) representative of said total solids of the impregnated host material,
  f. means responsive to said signals (G), and (U) for calculating the final weight of each solvent component and providing signals (X) representative of said final weights and
  g. means responsive to said signals (S), (T), (W), (X), (D), (F), (C), (H), (I), (J), (K), and (L) for computing said actual film coefficient and providing said signal (M).

14. Apparatus according to claim 11 wherein said means for providing solvent component percentages includes continuous on-line measurement means.

15. Apparatus according to Claim 11 wherein said controlling means comprises means mounted before said treater responsive to said signal (Q) for adjusting the temperature of said host material before impregnation.

16. Apparatus according to Claim 11 wherein said controlling means comprises means mounted before said treater responsive to said signal (Q) for adjusting the moisture content of said host material.

17. Apparatus according to claim 11 wherein said controlling means comprises means responsive to said signal (Q) for adjusting the temperature profile of said dryer.

18. Apparatus according to Claim 11 wherein said first, second and third gauge means are scanning gauges.

19. Apparatus according to Claim 11 wherein said controlling means comprises means mounted approximate to said resinous solution responsive to said signal (Q) for adjusting the temperature of said solution.

* * * * *